Sept. 24, 1957

B. A. RUNDE 2,807,412

MULTIPLE REGISTER FOR CALCULATING MACHINES

Filed Aug. 20, 1951

INVENTOR.
BYRON A. RUNDE
BY Fidler, Crane
 + Beardsley.
ATTORNEYS

INVENTOR.
BYRON A. RUNDE
ATTORNEYS

Fig. 7.

Sept. 24, 1957 B. A. RUNDE 2,807,412
MULTIPLE REGISTER FOR CALCULATING MACHINES
Filed Aug. 20, 1951 9 Sheets-Sheet 9

Fig.13.

INVENTOR.
BYRON A. RUNDE
BY
ATTORNEYS

United States Patent Office 2,807,412
Patented Sept. 24, 1957

2,807,412

MULTIPLE REGISTER FOR CALCULATING MACHINES

Byron A. Runde, Farmington, Mich., assignor to Burroughs Corporation, Detroit, Mich., a corporation of Michigan Application August 20, 1951, Serial No. 242,623

12 Claims. (Cl. 235—60.48)

This invention relates to improvements in multiple register mechanism for calculating machines such, for example, as are employed for accounting and bookkeeping.

When accounting and bookkeeping machines are provided, in addition to a main register or so-called "cross-footer," with a plurality of further registers to be employed, for example, to accumulate totals of different classes of amounts throughout a posting run, it is generally preferred, for reasons of economy of machine size and cost, to provide such further registers in an interspersed pinion type of multiple register structure, that is a structure of the kind in which the pinions of a group of such further registers are mounted on a common supporting shaft with the pinions of successive numerical order of each register interspersed between the pinions of the other registers of the group so that all of the pinions on the common shaft are arranged in a number of compact groups equal to the number of numerical orders and each containing the pinions of a single numerical order of all the registers of the group. The center to center spacing of adjacent groups of pinions of the multiple register unit is the same as the spacing of the differential actuators by which amounts are entered into or withdrawn from the registers and any register in the group may be brought into position for cooperation with said actuators and with a single tens-transfer mechanism for the group by a longitudinal movement of the pinion shaft of an extent less than such spacing.

As contrasted with the employment of a plurality of separate single register structures, the use of a multiple register unit, such as above outlined, requires that a substantial amount of time be allowed in the initial portion of each cycle of operation of the machine for cross-sliding of the multiple register pinions and their common supporting shaft to align the pinions of a selected register with the differential actuators before the latter are moved from their normal "0" positions to roll the pinions of the selected register back to their "0" positions in taking a total from the selected register. As that necessity cannot be avoided in total-taking operations, it is advantageous to perform substraction also by having the pinions in mesh with the differential actuators while the latter are moving away from their "0" positions instead of during the return of the differential actuators to "0" as in adding operations. It is apparent that any increase or decrease in the amount of time required for such register-selecting movement of the multiple register pinion support and for operation of the mechanism by which it is accomplished usually requires an equal increase or permit an equal decrease in the time allowed for the complete cycle of operation of the machine so that the cycling speed and productivity of the machine are directly affected.

An object of the present invention is to provide an improved multiple register mechanism.

A further object is to provide an improved multiple register mechanism including register selecting means operable reliably at high speed. A further object is to provide a mechanism of the above stated character which may be produced by manufacturing practices involving precision of generally the same order as required in the production of other mechanisms of accounting and bookkeeping machines.

A further object of the invention is to provide an accounting machine with a multiple register mechanism of the interspersed pinion type, including register selecting mechanism, and means which, while permitting the machine to be operated usually at a high cycling frequency, will insure that successive cycles of operation will, when necessary, be delayed sufficiently to insure that the multiple register mechanism is in proper condition for a further cycle of machine operation when such cycle is initiated.

Further objects and advantages of the invention will become apparent from the following description and the accompanying drawings in which.

The invention is shown in the accompanying drawings and described hereinafter as embodied in a Burroughs series F accounting machine which, except as herein particularly described and shown, is in all essentials like that fully disclosed in application of Thomas M. Butler, Serial No. 174,696, filed July 19, 1950, now Patent Number 2,629,548, issued February 24, 1953. Portions of the machine disclosed in said Butler application which are shown in the accompanying drawings and referred to hereinafter are identified by the same reference numbers by which they have been designated in the Butler application. Reference numbers enclosed in parentheses are reference numbers which, in the Butler application, designate parts omitted from the drawings annexed hereto. Elements which have been added to the machine of the Butler application or replace elements thereof are designated by reference numbers above 2800.

Figure 13:
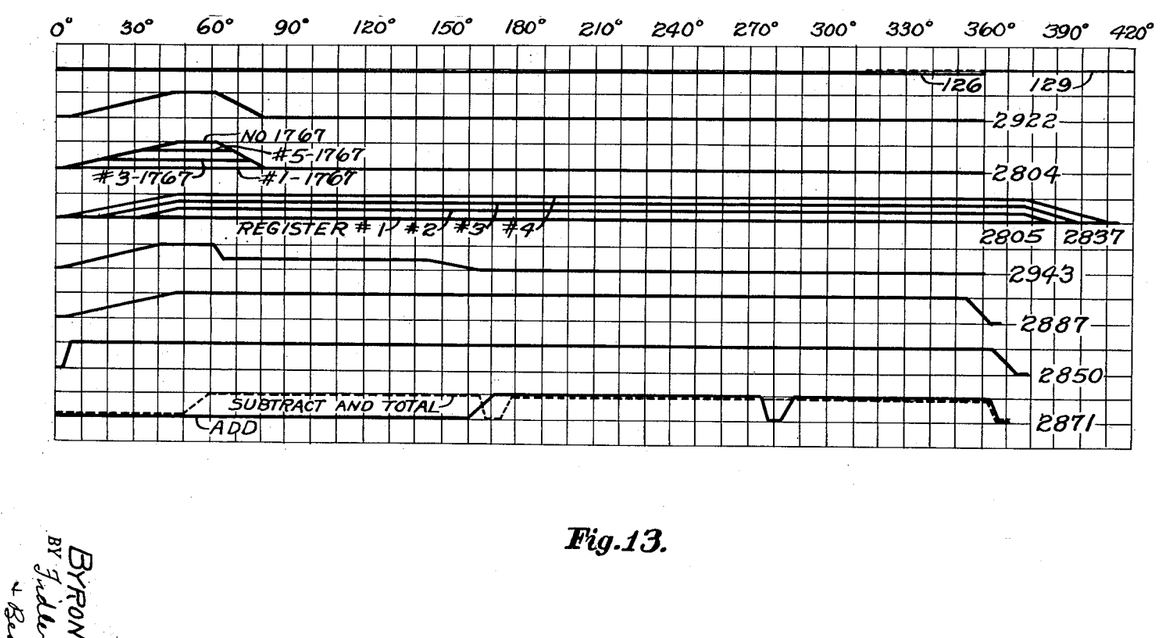
Fig. 13 is a timing chart in which the several graph lines are designated by the reference numbers identifying the machine elements, the timing of which is depicted by such graph lines.

Consistently with the description in said Butler application, the terms clockwise and counterclockwise will be employed to describe rotary or swinging movements of the parts as viewed from above, in front, or from the right side of the machine and the terms rightward, leftward, forward, rearward, upward, downward will be employed to describe motions and positions of the parts as viewed normally from in front of the machine. Also consistently with the description in the Butler application, timing of movements and actions of various elements of the machine is described with reference to degrees of a cycle of operation which is synonymous with degrees of rotation of the main cycling cam shaft 126 of the machine. In the present description, it will also be necessary to refer to the timing of movements and actions of elements occurring after the 360° point, that is, after the main shaft 126 has come to rest upon completing a full revolution. The clearest and most convenient manner of describing such timing is with reference to further rotation of the portion of the machine cycling clutch, specifically the toothed clutch disk 129 of the Butler application which rotates at all times while the machine drive motor runs. Accordingly, when an action or movement is referred to hereinafter as starting at 363°, it should be understood that such action or movement starts when said clutch disk 129 has moved 3° beyond the point (360°) at which the clutch pawl 135 of the Butler application carried on an arm secured on the main shaft 126, is disconnected from said disk 129. In Fig. 13, the timing beyond the 360° point of the machine cycle is based upon continuing rotation of the toothed clutch disk 129 of the Butler application after the main cycling cam shaft 126 is stopped. As disclosed in the Butler application, the machine cycling clutch is invariably disengaged at the end of each machine cycle even though it may be re-engaged almost immediately as when a motor bar is manually retained in depressed position of an automatic machine cycle is caused by the carriage governed automatic controls. In any event, the clutch pawl 135, having been disengaged from the toothed clutch disk, cannot re-engage the toothed disk to start a further revolution of the machine cycling shaft 126 until the toothed clutch disk 129 has rotated one tooth-space further. As the disk 129 has ten teeth, the minimum pause of the machine cycling shaft 126 corresponds to 36 degrees of rotation of the toothed clutch disk. Accordingly, even though the return to normal of some element of the machine occurred only a little before the 396° point, i. e., nearly 36° after the machine cycle, no additional provisions would be required to insure that a further machine cycle could not be initiated prior to the return to normal of such element. That consideration will be of importance in connection with the return to normal of parts of the hereinafter described multiple register mechanism following operations of certain ones of the registers.

Figure 5:
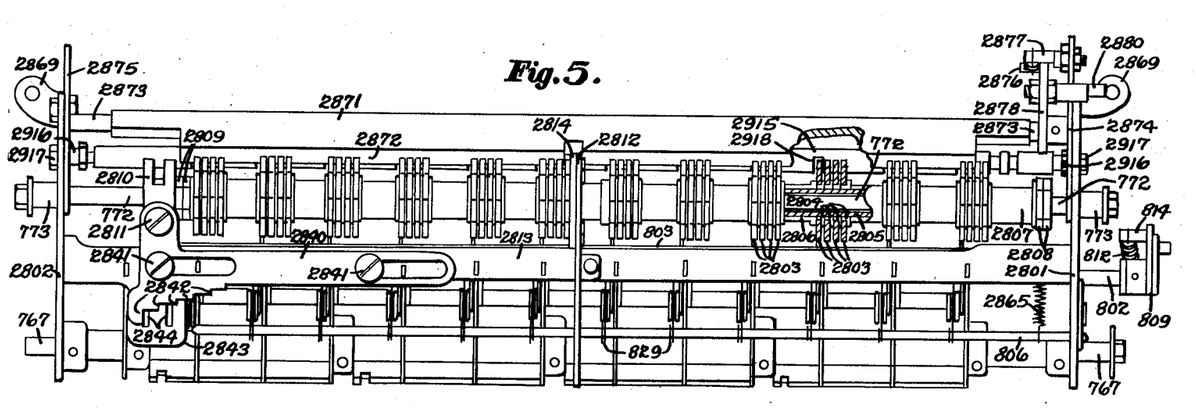
Fig. 5 is a top plan of the multiple register pinion frame.

In the machine herein disclosed, a multiple register unit is mounted in the machine frame in the same position and in the same manner as the rear crossfooter (761'—196') of the Butler application. The present machine also has a crossfooter which is located in the same position as the front crossfooter 761—196 of the Butler application and is of the same construction as the latter. The construction and operation of the multiple register unit of the present machine are extensively like the construction and operation of the crossfooter illustrated and described in detail in the Butler application. The features of the multiple register unit with which the present invention is most concerned are features in respect of which the multiple register unit differs from the crossfooter. The multiple register unit may, therefore, be most concisely described as being like the crossfooter except in the respects hereinafter pointed out. It should be noted that in the Butler application, the elements of the rear crossfooter which is replaced by the multiple register unit of the present application are designated by reference numbers which, except that they are primed, are the same as the reference numbers designating corresponding elements of the front crossfooter which is retained in the machine of the present application. The pivoted pinion-supporting frame of the multiple register unit (Figs. 1, 3, 5, 7 and 8) has a single pinion supporting shaft 772, the second pinion supporting shaft (771) together with elements (770, 782, 816 and 880—884) which cooperate with the negative total pinions (774) of the crossfooter being omitted from the present multiple register unit. The shaft 772 is supported between and secured to the pinion frame right and left end plates 2801 and 2802 in the same manner as the shaft 772 of the Butler crossfooter is secured to and supported between the pinion frame end plates (766). The pinions 2803 of the four registers of the illustrated multiple register unit are like the crossfooter pinions (774) except that they are substantially thinner than the latter. Each pinion 2803 is rotatably mounted on the reduced portion of a short shouldered sleeve 2804 (Figs. 3 and 5) which is like the sleeves (776) of the crossfooter except that it is shorter. The sleeves 2804 are mounted on a tube 2805 which, like the tube (777) in the crossfooter, has its end portions slidably fitting the shaft 772 and has a somewhat larger internal diameter intermediate its ends to prevent binding by slight flexing of the tube. The pinions 2803 and their sleeves 2804 are arranged in compact groups, each group containing the pinions and sleeves for a single order of all the registers, the sleeves 2804 and pinions 2803 of each group being spaced from those of adjacent groups by sleeves 2806. An additional spacing sleeve 2807 is placed on the right end of the tube 2805 between the rightmost pinion 2803 and the inner one of a pair of nuts 2808 threaded on the right end of the tube 2805. Another pair of nuts 2809 is threaded on the tube 2805 a short distance inwardly from its left end whereby all the sleeves 2804, 2806 and 2807 may be securely clamped in their proper positions on the tube. A member 2810 has a bore threaded to receive the left end of the tube 2805, is formed with a slot extending radially from its bore through the side of the member, and is contracted upon the tube 2805 by means of a headed screw 2811. In the multiple register pinion frame, between two of the interior spacing plates 817 near the middle of the unit, a plate 2812 is mounted on the shaft 767 in the same manner as the plates 817 and is secured to the upper side of a strip 2813 which is substituted for a somewhat similar strip (769) of the crossfooter. A guide and brace plate 2814 having an aperture slidably fitting one of the sleeves 2806 is secured, as by headed screws, to a rearward extension of the plate 2812. The plate 2814 serves to brace the pinion assembly near its center and, in cooperation with the shoulder on the embraced sleeve 2806, it serves also to arrest leftward movement of the register pinions with the tube 2805 in the position where the rightmost pinion 2803 of each numeral order group of pinions is vertically aligned with the actuator rack 511 of corresponding numerical order.

Figure 6:
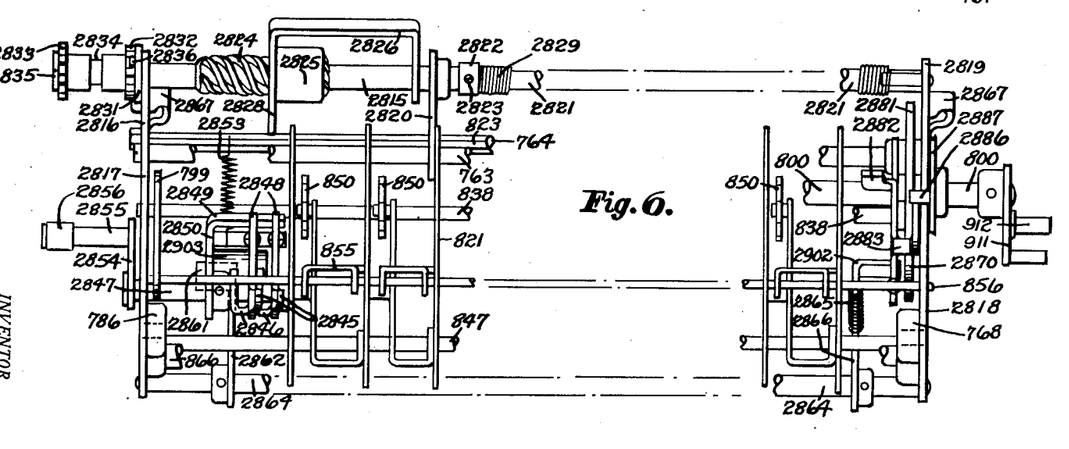
Fig. 6 is a partial top plan of the main frame, including the tens-transfer mechanism of the multiple register unit.
Figure 7:
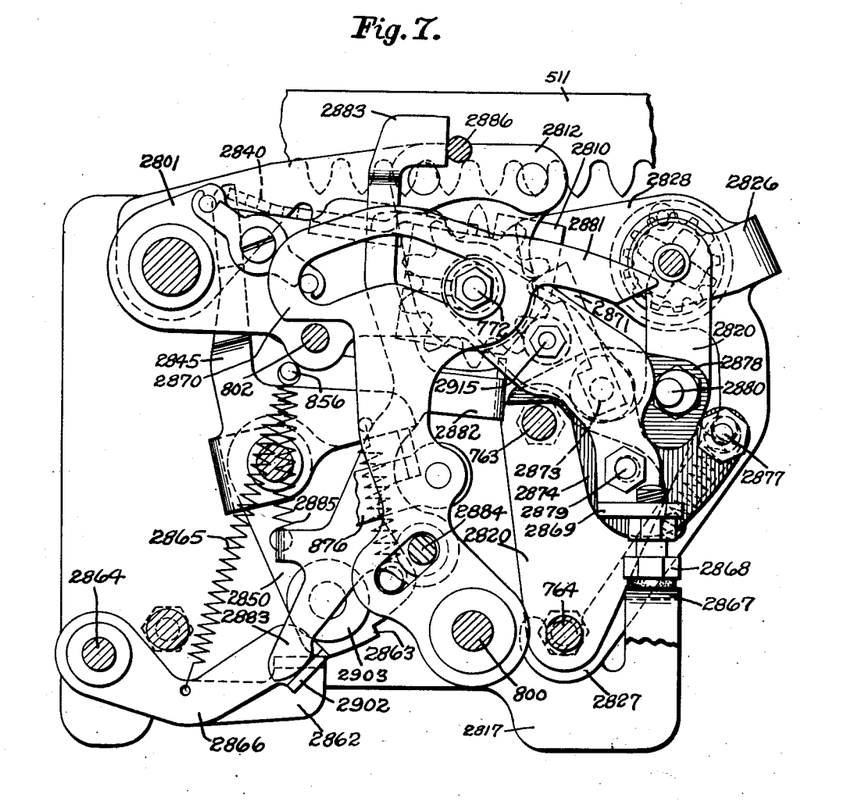
Figs. 7 and 8 are vertical fore and aft sections through the multiple register unit viewed leftwardly and rightwardly respectively.
Figure 8:
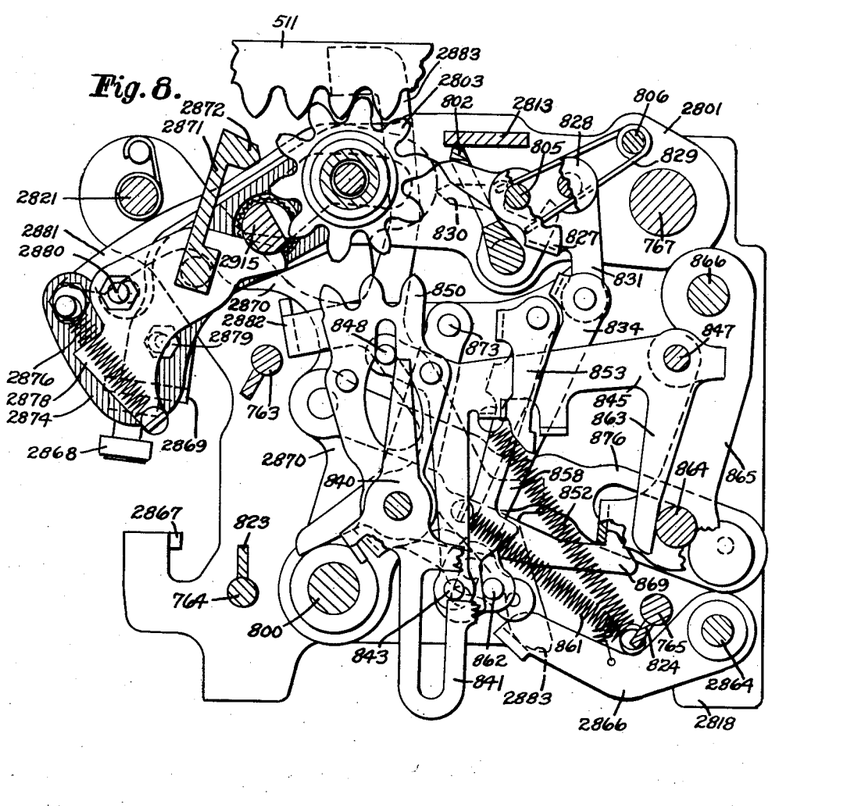

A shaft 2815 (Figs. 3, 4 and 6) is rotatably supported near its left end in an upwardly and rearwardly extending arm 2816 of the left side plate 2817 of the multiple register unit main frame, and near its right end in a bushing in a similar arm of a plate 2820 supported on the rods 763 and 764 and held against the left face of the third partition plate 821 inwardly from the left end of the register unit by the spacing strips 822 and 823. A similar arm 2819 on the right side plate 2818 of the register unit main frame is apertured to receive the reduced right end of a rod 2821. The reduced left end of the rod 2821 and the reduced right end of the shaft 2815 are received in opposite ends of the bore in a short sleeve 2822 which is secured to the shaft 2815 as by means of a set screw 2823. Intermediate its ends, the shaft 2815 has a portion 2824 of enlarged diameter formed with a right hand helical multiple thread. A collar 2825 threaded internally to fit the threaded portion 2824 of the shaft 2815 is secured in the left side portion of a yoke member 2826, the right side portion of which is apertured for guidance on the shaft 2815. An arm 2827 extending downwardly from the left side of the yoke member 2826 has a hook-like lower end portion engaging the lower half of the circumference of the rod 764 for guidance thereon. The end of a finger 2828 extending forwardly from the left side of the yoke member 2826 is received in a rearwardly open vertical slot in the upper rear portion of the member 2810. It will be apparent that rotation of the shaft 2815 will move the yoke member 2826 lengthwise of the shaft 2815 and that the finger 2828 and member 2810 will shift the tube 2805 and the pinions 2803 correspondingly along the shaft 772.

The shaft 2815 is yieldingly urged clockwise by a long coiled spring 2829 loosely surrounding the rod 2821. The right end portion of the sleeve 2822 has an external diameter somewhat greater than the internal diameter of the spring 2829, is formed with a thread having the same pitch as the spring, and is inserted into the left end of the latter. The right end of the spring 2829 is hooked on a stud 2830 secured in the arm 2819. Before the set-screw 2823 is tightened to secure the sleeve 2822 to the right end of the shaft 2815, the sleeve is rotated clockwise to pretension the spring sufficiently to insure rapid and complete return of the register pinion assembly to its rightmost position whenever it is released for such return, as will be described hereinafter.

The left end of the shaft 2815 extends a short distance leftward of the left end plate 2817 and, immediately at the left side of the plate 2817, has a disk-like flange 2831 thereon. Two pinions 2832 and 2833 are formed on opposite ends of a common hub 2834 which passes through the left side frame plate 28 of the machine and is retained on the left end of the shaft 2815 and in engagement with the flange 2831 by a headed screw 2835 threaded into the end of the shaft. A stud 2836 projecting from the left face of the flange 2831 is adapted to be engaged between any two adjacent teeth of the pinion 2832. The pinion 2833 meshes with a rack 2837 forwardly and rearwardly slidably mounted leftwardly of the left side plate 28 of the machine frame on grooved studs 2838 secured in the plate 28. Accurate full meshing alignment of the rack 2837 and pinion 2833 is maintained by a bracket 2939 having a portion secured flat against the left face of the plate 28 by headed screws and formed with an upwardly opening slot, the lateral edges of which engage in a groove in the hub of the pinions 2832 and 2833. The bracket 2939 also has a portion disposed vertically and at a right angle to the plate 28 and formed with an upwardly open slot with a narrow upper portion, the edges of which have sliding engagement with the side surfaces of the rack slide 2837 above the line of the rack teeth thereon. The pinion 2832 has one less tooth than the pinion 2833, so that, after loosening the screws mounting the bracket 2839, and loosening the screw 2835 and then adjusting the pinion 2832 one or more tooth spaces relative to the stud 2836 while simultaneously slipping the pinion an equal number of tooth spaces relative to the rack 2837, a fine adjustment of the shaft 2815 relative to the rack 2837 is obtainable. In the illustrated example, with fourteen teeth on the pinion 2832 and fifteen teeth on the pinion 2833, the shaft may be adjusted rotatively relative to the rack 2837 by increments equivalent to about .004 inch of longitudinal movement of the rack 2837.

The means, to be described in detail hereinafter, to move the rack 2837 from its normal rearward position to its several forward register selecting positions operates very early in the machine cycle and the pinion assembly is held in its corresponding leftward position beyond the 360° of the machine cycle. A slide 2840 (Figs. 3 and 5) has at its left end a rearwardly extending ear secured to the member 2810 by the screw 2811. The slide 2840 is guided on the upper face of the strip 2813 by two headed screws 2841 passing through rightwardly and leftwardly elongated slots in the slide and threaded into the strip 2813. The forward edge portion of the left end of the slide 2840 is formed with a series of shoulders 2842 which, considered serially from right to left, extend progressively farther forward, adjacent shoulders being spaced apart laterally twice the distance between adjacent register pinions 2803 of any one order. Beneath the left portion of the series of steps 2842, the strip 2813 has a forwardly extending portion 2843 formed with two forwardly and rearwardly extending parallel slots 2844 which are spaced apart laterally between centers one and one-half times the spacing of adjacent shoulders 2842. Two detent arms 2845 (Figs. 3 and 6) extend upwardly through the respective slots 2844 from respective ones of two yoke members 2846 rockable on a shaft 2847 which is rotatably supported in the plate 2817 and in the leftmost plate 821. Each of the yoke members 2846 has a second arm 2848 extending rearwardly over a rightwardly turned lug 2849 on a rearward arm of a plate 2850 fixed on a hub secured to the shaft 2847. Tension springs 2851 connected between the arms 2848 and a stud 2852 secured in the lower rear portion of the plate 2850 normally hold the arms 2848 against the lug 2849 and a tension spring 2853 connected between the stud 2852 and the strip 823 normally holds the plate 2850 and the yoke members 2846 in a counterclockwise position where the arms 2845 are forwardly clear of all except the leftmost one of the steps 2842 and limit in the forward ends of the slots 2844. The coiled spring 2829 normally holds the register pinion assembly at the rightward limit of its movement, determined by means described hereinafter, where the leftmost one of the shoulders 2842 is very close to but not bearing on the leftward one of the arms 2845 and where the pinions 2803 of the leftmost one of the registers, the #1 register, is aligned with the actuator racks 511. The registers successively rightward of the #1, normally active register are numbered, consecutively, #2, #3, and #4, for convenient reference hereinafter.

A crank arm 2854 is secured to the left end of the shaft 2847 leftwardly of the plate 2817 and carries a crank pin 2855 which extends through the plate 28 and carries a small roller 2856 on its left end. A long lever 2757 (Fig. 1) is pivoted at its rearward end on a stud 2858 secured in and projecting leftwardly from the plate 28. The forward end of the lever 2857 is guided in a vertical slot in the laterally turned portion of the bracket 2939 and rests on the roller 2856. A crank arm 2859 fixed on a hub secured to the left end of the main shaft 126 on the left side of the plate 28 carries a roller stud 2860 which, during the first few degrees of each machine cycle, acts on a cam portion of the upper edge of the lever 2857 and depresses it to rock the shaft 2847 and plate 2850 clockwise sufficiently to permit a leftwardly turned lug 2861 (Fig. 3) on the rear end of a lever 2862 to move up behind a latch shoulder 2863 on the lower edge of the plate 2850. The lever 2862 is secured at its rear end on a shaft 2864 rotatably supported at its ends in the plates 2817 and 2818 and urged counterclockwise by a tension spring 2865 connected between the rightward end of the rod 806 and an arm 2866 fixed to and extending rearwardly from a hub secured on the shaft 2864 near the plate 2818. As the plate 2850 is rocked clockwise, the springs 2851 cause the arms 2848 to follow the lug 2849 until, at about the 5° point in the machine cycle, the arms 2845 bear against the stepped forward edge of the slide 2840. As the register pinion assembly is shifted leftwardly on its shaft 772 by forward movement of the rack 2837, the arms 2845 alternately rock rearwardly at the right of the shoulders 2842 shifted leftwardly past them. If the right and left arms 2845 are designated R and L respectively and the shoulders 2842 are numbered serially from left to right, the arms 2845 will move into latching position with respect to the shoulders 2842 in the sequence L1 (normal), R3, L2, R4.

One or the other of the arms 2845 will then retain the register pinion assembly in a position with the pinions of the selected register aligned with the actuator racks 511 until the detent arms 2845 are again disabled.

It will be noted that six shoulders 2842 provided on the slide 2840 are sufficient to retain the register pinion assembly in nine different register selecting positions. Though only four registers are provided in the illustrated structure, the possibility of including as many as nine registers in the multiple register unit has been taken into account. Each of the shoulders 2842 may, therefore, be twice as large and have twice as much hold on a detent arm 2845 than could be obtained if nine shoulders were formed on the same portion of the slide 2840 and within the same limited space to cooperate with a single detent arm 2845.

The multiple register unit has a transfer mechanism, the transfer segments 850 (Figs. 6, 7 and 8) of which are located to cooperate with the pinions 2803 of whichever one of the registers may be aligned with the actuator racks 511 during an operation of the machine. The transfer mechanism is like that of the crossfooter except for alternations resulting from omission of "fugitive 1" mechanism (comprising the crossfooter parts 885—904) and omission of the means included in the crossfooter (and comprising the elements 827—833 associated with the highest order pinion of the crossfooter and the elements 784—793) to position the negative total pinions (774) for direct negative total taking. The "fugitive 1" segment (897) of the crossfooter is replaced in the multiple register unit by a transfer segment 850 (Fig. 6) like that provided in the other orders but serves only to hold the units order pinion of the register in active position against rotation while it is disengaged from the units order actuator rack 511. Also because of the omission of the negative total pinions (774) the parts 779, 782 and 816 are also omitted.

The upper ends of projections 2867 (Figs. 3, 6, 7 and 8) extending upwardly from the lower rear corners of the register unit side plates 2817 and 2816 are turned horizontally to abut small pads on the heads of two screws 2868 threaded into the horizontally bent ends of projections 2869 extending downwardly from the rear ends of the pinion frame side plates 2801 and 2802. The screws 2868 may be secured by lock nuts after adjustment to permit the pinions 2803 of the register in active position to mesh fully with the transfer segments 850 and yet permit easy cross sliding of the register pinion assembly without the pinions catching on the transfer segments.

The means to rock register pinion frame and the shaft 767 to engage the pinions of the selected register with the actuator racks 511 and return them into engagement with the transfer segments, including the rollers 773 on the ends of the shaft 772, the cams 799, shaft 800, crank 911 and stud 912 is the same as in the crossfooter unit except that the right hand cam member (799) is replaced by a cam member 2870 (Figs. 3, 6 and 7) having an added feature as described hereinafter.

Figure 9:
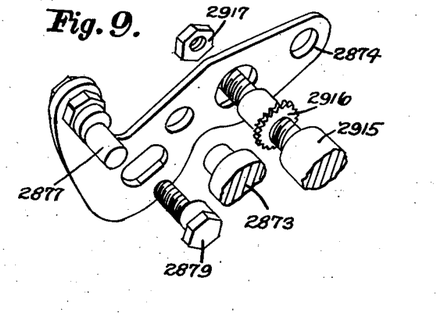
Fig. 9 is a detail of a portion of the structure shown in Fig. 3.

The bail (889) which, in the crossfooter unit, prevents accidental rotation of the pinions as they are moved from the transfer segments 850 to the actuator racks 511 and reversely, does so by engaging between teeth of the negative total pinions (774) which are omitted from the multiple register unit. That bail (880) and the supporting and moving parts (881—884) therefor are omitted from the multiple register unit which instead has a blade 2871 (Figs. 3, 5 and 8) formed with a forwardly directed flange 2872 along its upper edge and, at its ends, with trunnions 2873 on an axis which extends through the lower edge portion of the blade. The trunnions are pivotally supported in plates 2874 and 2875 pivoted on the reduced end portions of the pinion shaft 772 against the inner sides of the plates 2801 and 2802, respectively. The blade 2871 is urged counterclockwise to engage its forwardly directed flange between teeth of the pinions 2803 by a tension spring 2876 connected at its upper end to a stud 2877 (see also Fig. 9) eccentrically mounted in a rearward extension of the plate 2874 and at its lower end to a lug on a lever 2878 secured on a bushing pinned on the right hand trunnion 2873. The upper edge of the rearward end of the lever 2878 is normally held against the stud 2877 by the spring 2876. By rotating the eccentrically mounted stud 2877 in the plate 2874, the extent to which the flange 2872 enters between teeth of the pinions 2803 can be closely adjusted, and the stud 2877 can then be secured in adjusted position by means of a nut on its threaded shank. The plates 2874 and 2875, and thus also the blade 2871 and its flange 2872 are adjustable angularly about the axis of the pinion shaft 772 by means of headed screws 2879 (Figs. 7, 8 and 9) having eccentric shouldered portions in slots formed in the plates 2870 and 2871 and elongated radially from the axis of the shaft 772, said screws also having shanks passing through the plates 2801 and 2802 with nuts threaded on their outer ends.

As the shaft 800 and the left and right cam arms 799 and 2870 are rocked clockwise to raise the pinions 2803 toward the actuator racks 511, the rightward end of a stud 2880 (Figs. 3, 5 and 7) eccentrically mounted in the lever 2878 rearwardly of the right trunnion 2873 is brought into contact with a cam end of a projection 2881 extending rearwardly from the right cam arm 2870. After the pinions of the selected register have been partially meshed with the racks 511, the projection 2881 depresses the stud 2880 and rocks the lever 2878 and blade 2871 clockwise to retract the flange 2872 from between the teeth of the pinions 2803 as the clockwise rocking of the shaft 800 is completed and the pinions of the selected register are fully meshed with the actuator racks 511. The pinions of the selected register are thus held against turning accidentally as they are unmeshed from the transfer segments 850 and until they are meshed with the racks 511. When the shaft 800 and cam arms 799 and 2870 are returned counterclockwise to unmesh the pinions of the selected register from the racks 511 and remesh them with the transfer segments 850, the projection 2881 moves away from the stud 2880 and permits the spring 2876 to re-insert the flange 2872 of the blade 2871 between teeth of the pinions 2803 before the pinions of the selected register have been unmeshed from the racks 511. During the latter part of the downward movement of the register pinion frame, after the pinions of the selected register have been partially meshed with the transfer segments, the forward end of the lever 2878 engages the upper edge of a leftwardly bent projection 2882 (Figs. 3 and 7) of a lever 2883 pivotally mounted leftwardly of the cam arm 2870 on a stud 2884 secured in and projecting leftwardly from the plate 2818 through a slot in the cam arm 2870. As the downward movement of the register pinion frame is completed, the lever 2878 is rocked clockwise to retract the flange 2872 from between the teeth of the pinions 2803 as the pinions of the selected register are fully meshed with the transfer segments.

Figures 3, 4:
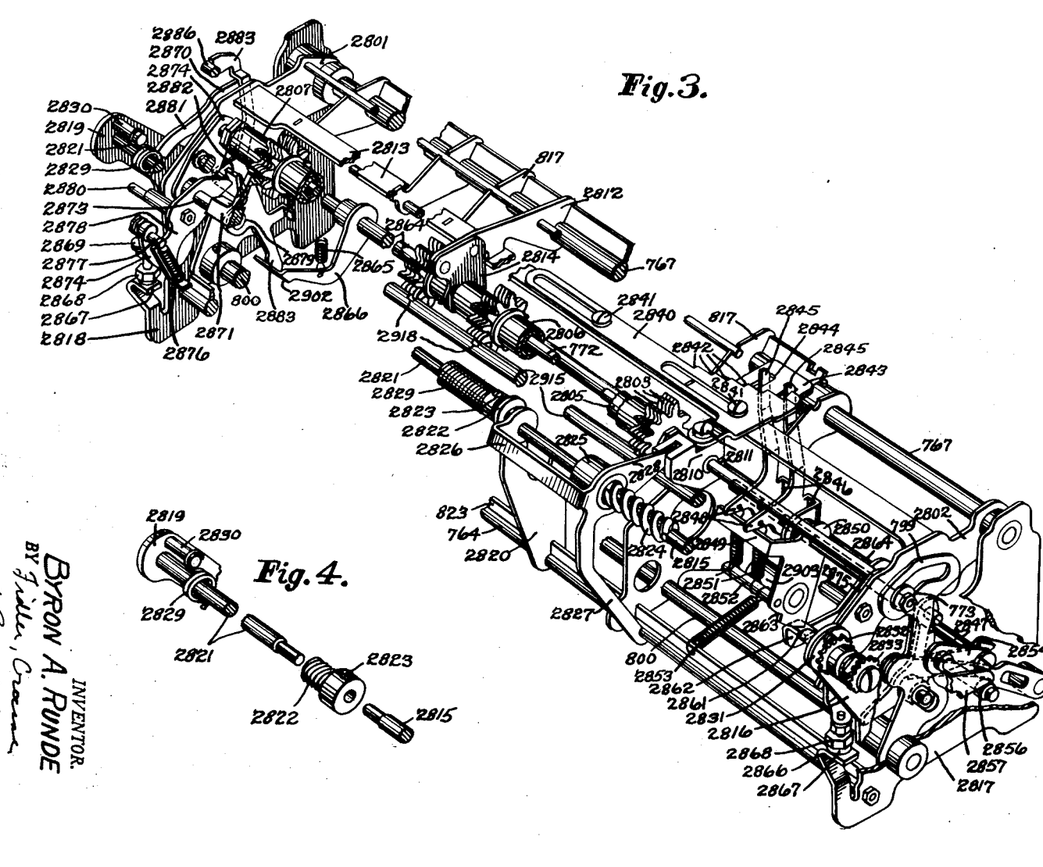
Fig. 3 is a spread perspective of a multiple register unit included in the present invention as viewed from the upper left rear corner and with certain parts omitted or broken away for clarity.
Fig. 4 is a detail view of a portion of the mechanism shown in Fig. 3.

The lever 2883 is urged clockwise by a tension spring 2885 connected at its upper end to the shaft 856 and at its lower end to a leftwardly bent end of a forward projection of the lower arm of the lever 2883. The spring 2885 normally maintains a rearwardly directed portion of the upper end of the lever 2883 engaged against a stud 2886 secured in a slide 2887 (Fig. 1) mounted leftwardly of and close to the right frame plate 27 for forward and rearward sliding movement on grooved studs 2888 secured to the plate 27 and engaged in slots in the slide 2887. The slide 2887 is normally yieldingly held at the forward limit of its movement by a tension spring 2889 connected at its rear end to an ear on the slide and at its forward end to a stud secured in the plate 27. A stud 2890 secured in the slide 2887 is engaged in a slotted end of downward arm of a bell crank lever 2891 pivotally mounted on a stud 2892 secured in the plate 27. The forward arm of the bell crank 2891 is normally in the path of a stud 2893 secured in a plate 2894 fixed on a bushing secured on the shaft 126. The parts are so arranged that the stud 2893 rocks the bell crank 2891 counterclockwise and moves the slide 2887 and its stud 2886 rearwardly during the first few degrees of each machine cycle, allowing the spring 2885 to rock the lever 2883 clockwise until the laterally bent portion of its rearward projection 2882 is stopped by the forward end of the lever 2878. The forward movement of the lower end of the lever 2883 allows the spring 2865 to rock the shaft 2864 and latch arms 2862 counterclockwise to engage the lug 2861 behind the latch shoulder 2863 against the lower edge of the plate 2850 which, during this very early portion of the machine cycle, has been rocked clockwise by the lever 2857 to allow the detent arms 2845 to engage against the stepped portion of the slide 2840.

A detent lever 2895 (Fig. 1) is pivotally mounted on a shouldered headed screw 2896 threaded into the plate 27. The lever 2895 is urged clockwise by a tension spring 2897 connected at its rear end to a downward arm of the lever 2895 and at its forward end to a stud secured in the plate 27. An inverted V-shaped cam portion 2898 on the end of a forward arm of the lever 2895 is normally held against a second stud 2899 secured in the plate 2894. At the very beginning of each machine cycle, the stud 2899 moves away from the cam portion 2898 and allows the spring 2897 to lower the laterally bent lug 2900 on the end of a rearward arm of the lever 2895 against the upper edge of the slide 2887. As the slide 2887 is moved rearwardly, the lug 2900 rides up an inclined rear edge of an upward projection 2901 on the slide 2887 and then drops down in front of the substantially vertical forward edge of the projection 2901 to latch the slide 2887 in a rearward position with the stud 2886 rearwardly clear of the lever 2883. Later in the machine cycle, as the register pinion frame is rocked upward to engage the pinions 2803 of the selected register with the racks 511 and the lever 2878 is rocked clockwise to retract the flange 2872 of the blade 2871 from the pinions 2803, the forward end of the lever 2878 clears the upper edge of the rightwardly bent portion of the projection 2882 and allows the spring 2885 to rock the lever 2883 farther clockwise to place the projection 2882 under the forward end of the lever 2878 so that, when the register pinion frame is again lowered and the pinions of the selected register are engaged with the transfer segments 850, the flange 2872 is again retracted from the pinions 2803.

The blade 2871 and its flange 2872 remain latched in retracted position until about the 363° point to insure the completion of a possible run-through tens-transfer such as will occur when an amount added in the selected register, previously containing an overdraft, is larger than the amount of such overdraft.

At about the 352° point in the machine cycle, the stud 2899 (Fig. 1) depresses the cam end 2898 of the forward arm of the latch lever 2895 and, at about the 354° point of the machine cycle, lifts the latch lug 2900 on the rearward arm thereof clear of the projection 2901 on the slide 2887 which is thereupon returned forwardly by its spring 2889 and causes the stud 2886 to engage the upper end of the lever 2883 and rock the latter counterclockwise to its normal position. As the lever 2883 is rocked counterclockwise it removes its projection 2882 (Fig. 3) from beneath the forward end of the lever 2878 slightly before the slide 2887 completes its forward movement at about the 363° point. The lever 2878 is thereupon rocked counterclockwise by its spring 2876 to reenter the flange 2872 of the blade 2871 between the teeth of the pinions 2803. The lower end of the lever 2883 also acts upon a rightwardly turned rear end portion 2902 of the arm 2866 and rocks the latter, the shaft 2864 and the latch arm 2862 clockwise to disengage the latch lug 2861 from the shoulder 2863 on the lower edge of the plate 2850. This also occurs just as the slide 2887 is completing its forward movement. The plate 2850 is thus released to the action of the springs 2851, 2852 and 2853. The plate 2850 has a weight 2903 secured to it near its lower end so that when the rightwardly turned rearward projection 2849 of the plate 2850 strikes the rearward projections 2848 of the detent yokes 2846 at about the 372° point, the blow will be sufficient to surely disengage either of the detent arms 2845 from the shoulder 2842 engaging it, and the spring 2853 will move both detent arms 2845 to their forward inactive positions. If the register pinion assembly was in either its #2, #3 or #4 register selecting position, the coiled spring 2829 will rotate the shaft 2821 clockwise so that the thread 2824 will shift the collar 2825, the tube 2805 and register pinion assembly on the latter rightwardly to the #1 register position. Though the normal or #1 register position of the register pinion assembly is determined by means cooperating with the rack slide 2837 and described fully hereinafter, any more than a very slight overthrow of restoring movement of the register pinion assembly will be stopped by engagement of the leftmost shoulder 2842 against the leftward one of the detent arms 2845. The clockwise rotation of the shaft 2821 and pinion 2833 by the spring 2829, with assistance mentioned hereinafter, returns the rack slide 2837 to its normal rearward position.

The return movement of the register pinion assembly toward its normal #1 register position does not commence until about the 378° point. After a machine cycle in which the #2 register was in active position, the return of the register pinion assembly to normal position is completed well before the 396° point. Even a return from the #3 register position is completed sufficiently close to the 396° point as not to require longer delay in initiating a further machine cycle. However, a return from the #4 register position is not completed until about the 410° point so that it becomes necessary for that reason to provide an interlock means to prevent initiation of a further machine cycle until the return of the register pinion assembly to normal is very close to completion. For that purpose, the machine cycling clutch control arm 145 (Fig. 1) is provided with a forwardly extending lug 2905 bent laterally above a detent arm 2906 secured to the rightward end of a shaft 2907 journaled in the plate 28 and in an upward and forward extension 2908 which has been added to one of the members 549. A lever 2909 fixed on a hub secured on the left end of the shaft 2907 has a rearward arm carrying a roller 2910. A tension spring 2911 connected at its forward end to an upward arm of the lever 2909 and, at its rearward end, to the stud 2858, yieldingly presses the roller 2910 downwardly against the upper edge of a cam projection 2912 extending from and above the register selecting rack slide 2837. Normally the cam 2912 supports the roller 2910 so as to position a latch shoulder 2913 on the forward end of the arm 2906 downwardly clear of the lug 2905 where it will not prevent the arm 145 from swinging rearwardly to initiate a machine cycle. However, when the rack slide 2837 is moved some distance forwardly of its normal position, the cam 2912 permits the roller 2910 to drop and the forward end of the arm 2906 to swing upwardly against the lug 2905. As disclosed in the Butler application, the arm 145 is returned rearwardly to its normal position near the end of each machine cycle. Such return of the arm 145 moves the lug 2905 rearwardly behind the latch shoulder 2913 and, if the cam 2912 on the register selecting rack slide 2837 is still too far forward to prevent, the latch shoulder 2913 will move up in front of the lug 2905 to block a cycle initiating movement of the arm 145. The cam 2912 is so proportioned as to move the latch shoulder 2913 clear of the lug 2905 when the register selecting rack slide 2837 reaches a position such that its return to normal will be completed in very nearly the same time as is required for the arm 145 to move to release the clutch lever 142 and for the latter to move downwardly far enough to permit the machine cycling clutch to become engaged to cause a further rotation of the shaft 126. It is found that the register pinion assembly and the rack slide 2837 return to their normal #1 register positions from their #2 register positions and, frequently, even from their #3 register positions, sufficiently rapidly to avoid delaying the initiating of further machine cycles beyond the 36° pause caused by the machine cycling clutch skipping a tooth between cycles. The above described interlock, however, acts to lengthen the enforced pause to 72° (a two tooth skip of the clutch) following a machine cycle in which the #4 register is operated.

To prevent accidental rotation of the pinions 2803 of registers not aligned with the actuator rack 511 and transfer segments 850 during those times in the machine cycle in which the flange 2868 of the blade 2867 is retracted from the pinions 2803, a rod 2915 (Figs. 3 and 5) extending parallel to the shaft 772 between aligned tooth spaces of all of the pinions 2803 has reduced end portions threaded into knurled nuts 2916 (see also Fig. 9) formed with eccentric portions rotatably fitted in the pinion frame end plates 2801 and 2802. By rotation of the nuts 2916 the rod may be adjusted relative to the pinions 2803 after which the parts may be secured in adjusted position by nuts 2917 threaded onto the ends of the rod 2915. The plates 2874 and 2875 are apertured to accommodate the nuts 2916 freely in all positions of adjustment. The rod 2915 is formed with notches 2918 aligned with and freely passing teeth of those pinions 2803 which are aligned with the racks 511 and transfer segments 850, i. e., the pinions of the register in active position.

Figures 1, 2:
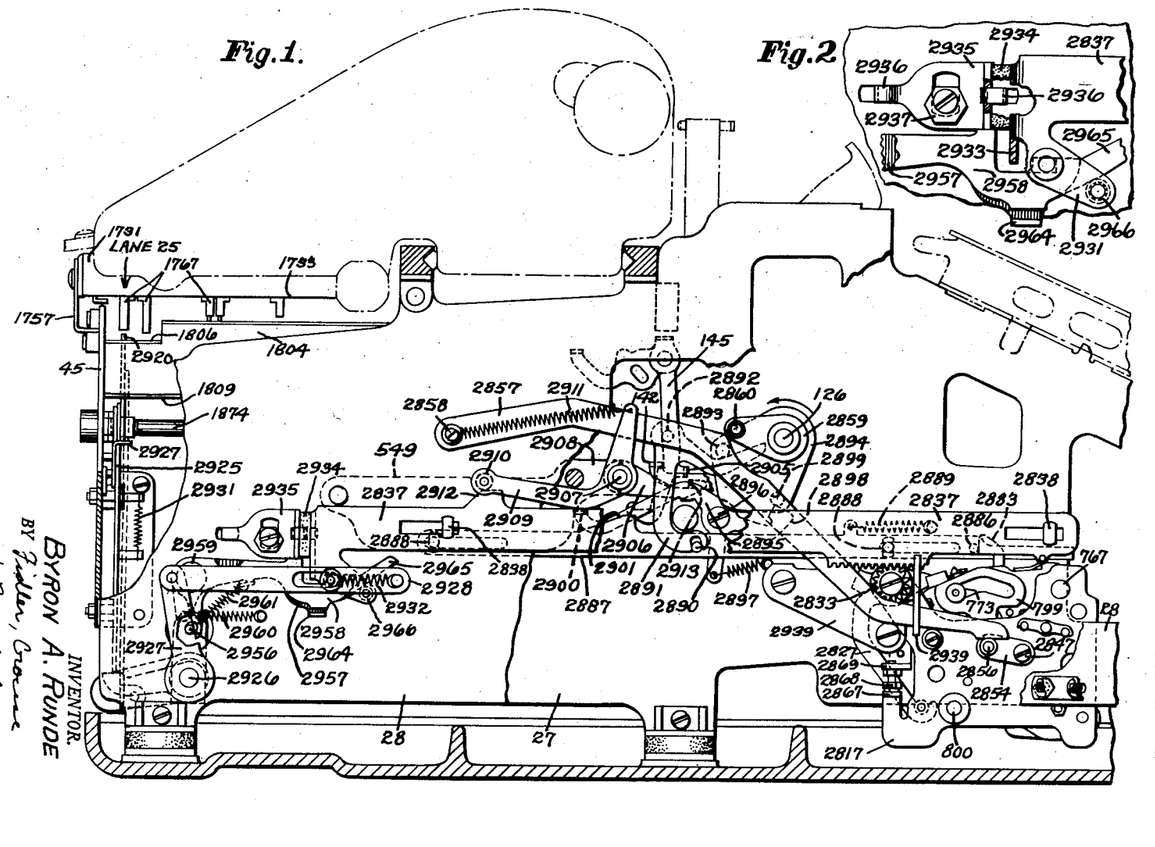
Fig. 1 is a partial left side elevation of an accounting machine embodying the present invention and with the machine casing removed and certain parts omitted or broken away to show more clearly elements included in the present invention.
Fig. 2 is a detail view of a portion of Fig. 1.
Figure 10:
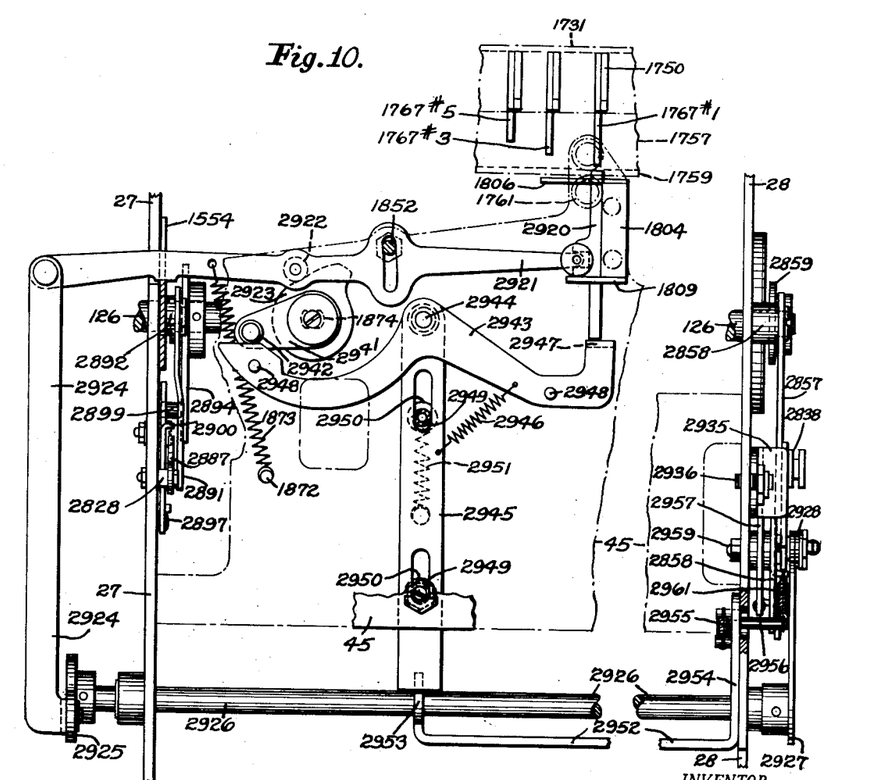
Fig. 10 is a partial rear elevation of portions of the carriage governed register selecting means and overthrow limiting means.
Figure 11:
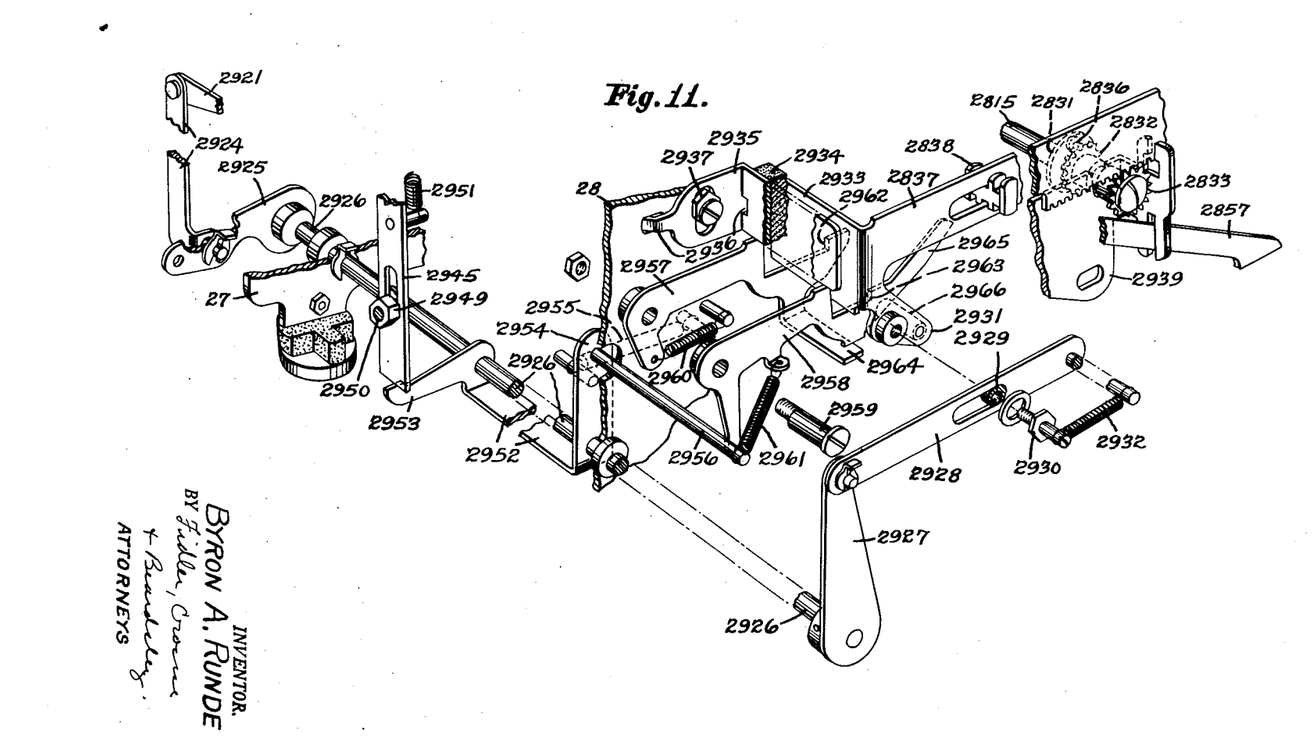
Fig. 11 is a spread perspective of a portion of the overthrow limiting means as viewed from the upper left rear corner.

The register selecting movements of the rack slide 2837 are effected by carriage-controlled mechanism shown in Figs. 1 and 10. In the machine disclosed in the Butler application, lane 25 in the carriage-governed control mechanism was left unused. The carriage controlled register selecting means of the present machine utilizes the previously unused lane 25. A sensing pin 2920 like the sensing pins 1825 and 1827 of the Butler application but located in the lane 25 position, i. e., in the rearmost apertures in the plates 1806 and 1809, is coupled with a control lever 2921 (Fig. 10) in the same manner as the sensing pins of the Butler application are coupled with their respective control levers. The lever 2921 is guided on the stud 1852 in the same manner as the lane 22 control lever 1847 of the Butler application and in the rearmost guide slot in the comb plate 1554. It is normally held in its lower position by a spring 1873 connected to the rod 1872 and to the lever 2921 at a point leftward of the comb plate 1554 and rightward of the automatic sensing control cam shaft 1874. The lever 2921 carries a roller 2922 positioned to be engaged by the edge of a cam disk 2923 mounted in the lane 25 position on the cam shaft 1874 for rotation with the latter. The rightward end of the lever 2921 is pivotally connected, rightwardly of the comb plate 1554, with the upper end of a link 2924 which is pivotally connected at its lower end with an arm 2925 (Figs. 10 and 11) secured upon and extending rearwardly from a hub pinned on a shaft 2926 journalled in bushings secured in the frame plates 27 and 28. An arm 2927 is secured to and extends upwardly from a collar pinned on the left end of the shaft 2926 leftwardly of the plate 28. The upper end of the arm 2927 is pivotally connected with the rearward end of a link 2928 (Figs. 1 and 11) having a forwardly and rearwardly elongated slot embracing an eccentric collar 2929 rotatably adjustable on a headed screw 2930 threaded into a bushing in a projection 2931 extending downwardly and forwardly from the rear end portion of the rack slide 2837. A tension spring 2932 connected to a stud extending from the head of the screw 2930 and to a stud in the forward end of the link 2928 normally maintains the forward end of the slot in the link 2928 engaged against the eccentric collar 2913.

The spring 1873 connected to the lever 2921 normally maintains the latter and the link 2924 in their lower positions, the shaft 2926 and arms 2925 and 2927 clockwise and the link 2928 and rack slide 2837 at their rearward limits where a rightwardly turned rear end portion 2933 of the slide 2837 limits against a resilient cushion 2934 secured to a leftwardly turned part of a bracket 2935. The bracket 2935 (see also Fig. 2) has rightwardly bent lugs 2936 guided in forwardly and rearwardly elongated slots in the plate to which it is adjustably secured by a headed screw passing through a collar 2937 having an eccentric portion embraced in an upwardly and downwardly elongated slot in the bracket 2935. By adjustment of the eccentric collar 2937, the cushion 2934 is positioned to limit the rack slide 2837 to place the pinions 2803 of the #1 register accurately normally in alignment with actuator racks 511 and transfer segments 850.

In the initial portion of the machine cycle, the cam disk 2923 lifts the roller 2922 and mid-portion of the lever 2921. The spring 1873 connected to the lever 2921 causes the left end of the lever 2921 and the sensing pin 2920 to be lifted until the sensing pin 2920 is stopped by a control projection 1767 above it or limits against the upper guide plate 1806. In the latter event, the rightward end of the lever 2921 and link 2924 are not elevated, and the rack slide 2837 and register pinion assembly remain in their normal #1 register position. If, however, the sensing pin 2920 encounters a control projection 1767 above it, the rightward end of the lever 2921 and the link 2924 are raised against the tension of the spring 1873 connected to the lever 2921, shaft 2926 and arms 2925 and 2927 are rocked counterclockwise, the link 2928 and rack slide 2837 are moved forwardly, the shaft 2815 is rotated counterclockwise and the register pinion assembly is shifted leftwardly from its normal #1 register position to align the pinions 2803 of another one of the registers with the actuator racks and transfer segments. Such movements of the parts are about inversely proportional to the length of the control projection 1767 encountered by the sensing pin 2920. A #5 control projection 1767 will place the #2 register in active position, a #3 control projection 1767 will place the #3 register in active position and a #1 control projection 1767 will place the #4 register in active position. The lengths of the #1, #3 and #5 control projections 1767 are the same as the lengths of the control projections 1767 given the same designations in the Butler application.

It will be seen that the high portion of the cam disk 2923 (Fig. 10) has only a short dwell which is sufficient to insure that the detent arms 2845 (Fig. 3) in the register unit will obtain full holds on the shoulders 2842 to latch the register pinion assembly in the selected register positions and that any rebounds of the register selecting parts will be checked. When the high portion of the cam 2923 passes the roller 2922, the leftward end of the lever 2921 and the sensing pin 2920 are lowered to their normal positions by the spring 1873 so that they will not interfere with any tabulating or return movement of the paper carriage. The rightward end of the control lever 2921 and the parts moved thereby remain in their moved positions until the detent arms 2845 are returned to normal near the very end of the machine cycle as previously explained, and are at that time returned to normal by the coil spring 2829 in the register unit and the spring 1873 connected to the control lever 2921.

As previously indicated, the brace plate 2814 in the multiple register unit limits overthrow of the register pinion assembly, and thus also of the rack slide 2837, when the register pinion assembly is moved to its #4 register position. Additional means are provided to limit overthrow of the rack slide 2837 and register pinion assembly when the #2 and #3 registers are selected. A crank arm 2941 (Fig. 10) secured on a hub mounted on the sensing control cam shaft 1874 between the cam 2923 and the plate 45, carries a roller 2942 normally engaged by the rightward cam end of a lever 2943 which is pivotally mounted intermediate its ends on a stud 2944 secured in the upper end of a slide 2945. A tension spring 2946 connected at its upper end to the leftward arm of the lever 2943 and at its lower end to the slide 2945 normally holds the rightward end of the lever 2943 against the roller 2942. The leftward end of the lever 2943 has a lug 2947 bent forwardly immediately under the sensing pin 2920. Two studs 2948 secured in and projecting rearwardly from the lever 2943 have guiding contact with the forward face of the plate 45. The slide 2945 has a pair of vertically elongated slots embracing eccentric shoulders on the forward ends of two studs 2949 rotatably adjustably mounted on the forward side of the plate 45, the slide being retained on the studs 2949 by headed screws 2950. The slide 2945 is normally held at the upper limit of its movement by a tension spring 2951 secured at its lower end to a stud in the slide 2945 and at its upper end to a stud projecting forwardly from the head of the upper one of the screws 2950. A yoke member 2952 (see also Fig. 11) rockably mounted on the shaft 2926 has on its right side an arm 2953 extending rearwardly under the lower end of the slide 2945 and on its left side an arm 2954 extending upwardly on the inner face of the plate 28. The arm 2954 carries an inwardly projecting stud connected to the rear end of a tension spring 2955 which is connected at its forward end to a stud secured in the plate 28 and urges the yoke 2952 counterclockwise. The arm 2954 also carries a stud 2956 extending leftwardly through an aperture in the plate 28. A pair of overthrow limit pawls 2957 and 2958 are pivotally mounted on an eccentric stud 2959 rotatably adjustably mounted in the plate 28 above and a little forwardly of the stud 2956. The rightward pawl 2957 has a short downward arm connected to the rear end of a tension spring 2960 which is connected at its forward end to a stud secured in the plate 28 and normally holds the upper edge of an intermediate portion of a forward arm of the pawl 2957 against the lower edge of the bracket 2935. The leftward pawl 2958 has a longer downward arm which is normally held rearwardly against the stud 2956 by a tension spring 2961 connected at its forward end to a forward arm of the pawl 2958 and at its rearward end to the stud 2956. The spring 2955 normally holds the upper edge of an intermediate portion of the forward arm of the pawl 2958 against the lower edge of the bracket 2935. Forwardly of their contact with the bracket 2935, the upper edges of the forward arms of the pawls 2957 and 2958 are cut down to permit them to pass under and forwardly of the rightwardly bent rear end portion 2933 of the rack slide 2837. Near its forward end, the forward arm of the pawl 2957 has a shoulder 2962 projecting upwardly into the path of the portion 2933 of the rack slide 2837 normally to arrest forward movement of the latter at a point very slightly beyond its #3 register selecting position. The pawl 2958 has a similar shoulder 2963 normally located to arrest forward movement of the rack slide 2837 at a point very slightly beyond its #2 register selecting position.

At the beginning of a machine cycle, the stud 2942 (Fig. 10) depresses the rightward end of the lever 2943 and causes the lug 2947 to follow the lower end of the sensing pin 2920 upwardly as far as the sensing pin would be permitted to rise if a #5 control projection 1767 were above it. If a #5 control projection 1767 or no control projection 1767 is encountered by the sensing pin 2920, the slide 2945 is not depressed and the yoke 2952 and pawls 2957 and 2958 are not disturbed. If no control projection 1767 is encountered by the sensing pin 2920, the rack slide 2837 is not moved forwardly and the #1 register remains in active position. If a #5 control projection 1767 is encountered by the sensing pin 1767, the slide 2945 is not depressed to rock the yoke 2952 or disturb either pawl 2957 or 2958. The shoulder 2963 on the pawl 2958 limits overthrow of the rack slide 2837 beyond its #2 register selecting position. It will be remembered that the #5 control projection 1767 causes the rack slide 2837 to be moved forwardly to its #2 register selecting position. The register pinion assembly with the shouldered plate 2840 is permitted to throw just far enough beyond the #2 register position to provide clearance for the right hand detent arm 2845 to move rearwardly on the right side of the third shoulder 2842 and hold the pinion assembly in the #2 register position. When a #3 control projection 1767 is encountered by the sensing pin 2920, the slide 2945 is depressed by the lever 2943 far enough to rock the yoke 2952 sufficiently to rock the pawl 2958 counterclockwise to remove its shoulder 2963 from the path of the portion 2933 of the rack slide 2837 without disturbing the pawl 2857, the shoulder 2962 of which then arrests the rack slide 2837 slightly forwardly of its #3 register selecting position. When the sensing pin 2920 encounters a #1 control projection 1767, the slide 2945 and yoke 2952 are moved to such an extent that the pawl 2958 is rocked counterclockwise far enough to engage a lug 2964 extending leftwardly under it from the forward arm of the pawl 2957 and rock the latter pawl to remove its shoulder 2962 from the path of the portion 2933 of the rack slide 2837. The movement of the register pinion assembly is then limited slightly beyond its #4 register position by the brace plate 2814.

The pawl 2958 has a forwardly and upwardly extending projection 2965 adapted to bear on a roller 2966 on a stud secured in the projection 2931 of the rack slide 2837. The lower edge of the projection 2965 of the pawl 2958 is so shaped that, as it rides on the roller 2965 as the latter moves forwardly with the rack slide 2837 toward the #3 register selecting position of the latter, the counterclockwise movement of the pawl 2958 is regulated and prevented from becoming so rapid as to cause the pawl 2958 to overthrow with sufficient force to strike the lug 2964 on the pawl 2957 and knock the latter out of position to arrest the rack slide 2837.

The cam arm of the lever 2943 is shaped so that its depression by the roller 2942 is completed as the high point of the cam 2923 reaches the roller 2922 and its return to normal is completed slightly before the return of the control lever 2921 to normal is completed.

The manual and automatic function controls for the multiple register unit of the present machine are the same function controls which are provided for the rear cross-footer of the machine of the Butler application except for the addition of one interlock, described hereinafter, and except that the elements (905' to 910', and 996' to 1002') which are provided in the machine of the Butler application for positioning the pinions of the rear crossfooter for direct negative total taking are without effect on the multiple register unit of the present machine and are preferably omitted though, if included, they would not interfere with proper functioning of the multiple registers. The selected register of the multiple register unit will normally add but may be manually controlled for addition, direct subtraction, non-adding, total-taking and subtotal taking by means of the function control keys in the key-row 17 of the machine of the Butler application and is automatically conditioned for such functions, other than addition, by the automatic carriage governed controls of control lanes 9, 10 and 11 of the machine of the Butler application.

As the registers of the multiple register unit of the present machine are selected only automatically by the previously described carriage controlled selecting means and there is no provision for manual selection of the registers, it is necessary to place the paper carriage in the appropriate positions for selecting the respective registers when it is necessary to take totals from the several registers at the end of a posting run. Without the interlock hereinafter described, a total cannot be taken from a register in a columnar position of the carriage where the crossfooter is automatically conditioned for total taking. If the automatic function controls are disabled (by lever 2118), register selection is also disabled. It is, of course, possible to set up an entirely automatic register totaling program on the control unit (in the pan 1731, Fig. 155) disclosed in the Butler application. Then, after rotation of the program control knob (1741), shifting the carriage to the proper starting position and depressing a motor bar, all or any desired registers would be totalled in successive machine cycles without any further intervention by the operator. It is also possible in many cases, to provide the control unit (1731) on the carriage with additional column stops and register selecting and totaling control projections and lane 4 skip tabulation control projections (1784) so that the desired registers can be totalled in operations initiated by the skip motor bar (292) and control projections in the lanes 15 and 18 can be provided to cause an entire series of register totalling operations to follow automatically after a single depression of the lower motor bar (294). However, it is preferable to equip the machine with a simple interlock device to disable the automatic total-taking control of the crossfooter whenever the manual total-taking control for the register is in total-taking condition.

Figure 12:
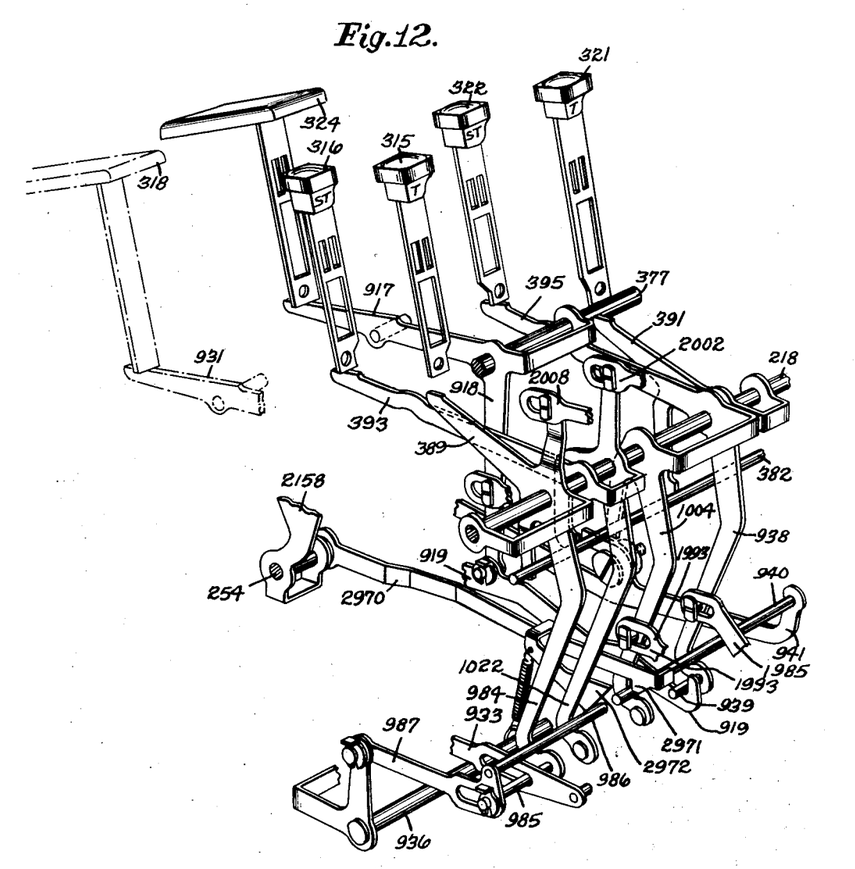
Fig. 12 is a spread perspective of portions of the cross-footer and register function controls as viewed from the upper right rear corner and including an interlock device.

Figure 12 shows portions of function controls of the machine of the Butler application with the addition of the above-mentioned interlock. As disclosed in the Butler application, the stud 940 must move rearwardly to condition the crossfooter (front crossfooter of the Butler application) for either total-taking or subtotal-taking. The keys 315 and 316 which conditioned the rear crossfooter of the Butler application for total-taking and subtotal-taking, condition the automatically selected registers of the present machine for the same functions. To condition a register of the present machine or the rear crossfooter of the Butler application for taking a total or subtotal, it is necessary for the stud 986 to move rearwardly. In the present machine, a latch pawl 2970 pivotally mounted at its forward end on the stud 254 next leftwardly of the yoke member 2158 has on its rear end portion a downward shoulder 2971, the vertical forward edge of which is normally a short distance rearward of the stud 940. A rightwardly offset cam projection 2972 of the latch pawl 2970 extends rearwardly above the stud 986 and is downwardly into contact with the latter by a tension spring 2973. The cam projection 2972 is so shaped that it normally holds the shoulder 2971 upwardly clear of the stud 940. However, when the register total key 315 or register subtotal key 316 is depressed, the stud 986 moving rearwardly permits the rear end of the pawl 2970 to drop and place the shoulder 2971 behind the stud 940. In that position of the parts, the stud 940 is permitted by the shoulder 2971 to be moved rearwardly only far enough to place the front crossfooter controls in non-add condition. Thus, when a total is taken from a register in a columnar position where a total or subtotal is normally automatically drawn from the crossfooter, the register total will not be entered into the crossfooter.

The present machine may be used for a great variety of work as will be readily apparent to those skilled in the art so that it seems unnecessary to describe any particular examples of such work.

I claim:

1. In a calculating machine having means to drive it through cycles of operation, a frame, a traveling carriage on said frame and movable to a plurality of positions relative thereto, and a plural order series of differential actuator racks, a multiple register mechanism comprising a multiple register pinion assembly mounted in said frame movement transversely of said racks, means to move said register pinion assembly to align the pinions of selected registers with said racks, a sensing element mounted on said frame for movement toward and from said carriage, register selection control projections on said carriage arranged in a row parallel to the direction of movement of said carriage and intersecting the path of movement of said sensing member to position different ones of said projections in the path of said sensing member when said carriage is in different ones of said positions, said projections extending, parallel to the line of movement of said sensing member, different distances toward said frame to limit said sensing member, when in its path, to different extents of movement, said sensing member being normally positioned out of the path in which said projections are moved by movement of said carriage, and differential drive means differentially connected with said sensing member and said pinion assembly moving means and operated from said machine driving means to differentialy drive both said sensing member toward said row and said pinion assembly moving means to move said pinion assembly to register selecting positions related to the lengths of register selection control projections encountered by said sensing member.

2. In a calculating machine having means to drive it through cycles of operation, a frame, a traveling carriage on said frame and movable to a plurality of positions relative thereto, and a plural order series of differential actuator racks, a multiple register mechanism comprising a multiple register pinion assembly mounted in said frame for movement transversely of said racks, means to move said register pinion assembly to align the pinions of selected registers with said racks, a sensing element mounted in said frame for movement toward and from said carriage, register selection control projections on said carriage arranged in a row parallel to the direction of movement of said carriage and intersecting the path of movement of said sensing member to position different ones of said projections in the path of said sensing member when said carriage is in different ones of said positions, said projections extending, parallel to the line of movement of said sensing member, different distances toward said frame to limit said sensing member, when in its path, to different extents of movement, said sensing member being normally positioned out of the path of said projections, differential drive means differentially connected with said sensing member and said pinion assembly moving means and operated from said machine driving means to differentially drive said sensing member toward said row and said pinion assembly moving means to move said pinion assembly to register selecting positions related to the lengths of register selecting projections encountered by said sensing member, variable limit means cooperating with said pinion assembly moving means to limit the throw thereof, a sensing member follower element, means to condition said variable limit means to vary the permitted throw of said register pinion assembly moving means to permit movement thereby of the register pinion assembly to respective register selection positions, and a second differential drive means operated from said machine driving means to differentially drive said sensing member follower element in following relation to said sensing member and said conditioning means to condition said limit means to limit the throw of said register pinion assembly moving means in accordance with the lengths of the register selection control projections encountered by said sensing member.

3. In a calculating machine having means to drive it through cycles of operation, a frame, a traveling carriage on said frame and movable to a plurality of positions relative thereto, and a plural order series of differential actuator racks, a multiple register mechanism comprising a multiple register pinion assembly mounted in said frame for movement transversely of said racks to align the pinions of selected registers with said racks, means normally urging said register pinion assembly to the limit of its movement in one direction, means to move said register pinion assembly in the opposite direction, a sensing element mounted in said frame for movement toward and from said carriage, register selection control projections on said carriage arranged in a row parallel to the direction of movement of said carriage and intersecting the path of movement of said sensing member to position different ones of said projections in the path of said sensing member when said carriage is in different ones of said positions, said projections extending, parallel to the line of movement of said sensing member, different distances toward said frame to limit said sensing member, when in its path, to different extents of movement, said sensing member having a normal position out of the path of said projection, differential drive means differentially connected with said sensing member and said pinion assembly moving means and operated from said machine driving means to differentially drive said sensing member toward said row and said pinion assembly moving means to move said pinion assembly to register selecting positions related to the length of register selecting projections encountered by said sensing member, and to retract said sensing member from said row to its normal position, all early in a machine cycle, detent means to detain said register pinion assembly in its several register selecting positions, and means operated from said machine driving means late in a machine cycle to disable said detent means.

4. In a cyclically operable calculating machine having printing means, columnar record media supporting means, said printing means and supporting means being relatively movable columnwise, a first register operable in each machine cycle, function control means for said first register, and first control means governed automatically in accordance with the relative positions of said printing means and supporting means to condition said function control means to cause total-taking from said first register in a machine cycle initiated when said printing means and supporting means are in a predetermined relative position, the combination of a plurality of other registers operable individually in different machine cycles, further control means govered automatically in accordance with the relative positions of said printing means and supporting means, selecting means for said other register and controlled solely by said further automatically governed control means to select one of said other registers for operation in machine cycles initiated when said printing means and supporting means are in said predetermined relative position, function control means for said other registers, manipulative means to condition said last-named function control means to cause total-taking from the selected one of said other registers, and interlock means conditioned by said manipulative means when in total-taking condition to render said first automatically governed control means ineffective to condition the function control means for said first register to cause total-taking from said first register.

5. In a cyclically operable calculating machine having printing means, columnar record media supporting means, said printing means and supporting means being relatively movable columnwise, a first register operable in each machine cycle, function control means for said first register, and first control means governed automatically in accordance with the relative positions of said printing means and supporting means to condition said function control means to cause total-taking from said first register in a machine cycle initiated when said printing means and supporting means are in a predetermined relative position, the combination of a plurality of other registers operable individually in different machine cycles, further control means governed automatically in accordance with the relative positions of said printing means and supporting means, selecting means for said other register and controlled solely by said further automatically governed control means to select one of said other registers for operation in machine cycles initiated when said printing means and supporting means are in said predetermined relative position, function control means for said other registers, manipulative means to condition said last-named function control means to cause total-taking from the selected one of said other registers, and means conditioned by said manipulative means when in total-taking condition to cause said first automatically governed control means to place the function control means for said first register in non-add condition when said first automatically governed control means would otherwise place it in total-taking condition.

6. In a cyclically operable calculating machine having printing means, columnar record media supporting means, said printing means and supporting means being relatively movable columnwise, a first register operable in each machine cycle, function control means for said first register adjustable to a total-taking condition through an intermediate condition in which it causes said first register to be non-added, and first control means governed automatically in accordance with the relative positions of said printing means and supporting means to adjust said function control means through said non-adding condition to said total-taking condition in a machine cycle initiated when said printing means and supporting means are in a predetermined relative position, the combination of a plurality of other registers operable individually in different machine cycles, further control means governed automatically in accordance with the relative positions of said printing means and supporting means, selecting means for said other registers and controlled solely by said further automatically governed control means to select one of said other registers for operation in machine cycles initiated when said printing means and supporting means are in said predetermined relative position, function control means for said other registers, manipulative means to condition said last-named function control means to cause total-taking from the selected one of said other registers, and interlock means conditioned by said manipulative means when in total-taking condition to limit adjustment of the function control means for said first register by said first automatically governed control means to said intermediate, non-add condition.

7. A calculating machine having means to drive it through cycles of operation, a frame, a carriage movable on said frame to a plurality of positions relative thereto, means controlled automatically in accordance with the positions of said carriage, a multiple register pinion assembly movable to any of a series of register selecting positions, means normally positioning said assembly in one end position of said series, means driven by said drive means in the initial portion of a machine cycle and governed by said carriage-controlled means to move said pinion assembly rapidly from said normal position to any other position of said series selected by said carriage-controlled means, variable limit means conditionable to prevent substantial overthrow of said pinion assembly beyond various ones of said other positions, and means driven by said drive means in the initial portion of the machine cycle and governed by said carriage-controlled means to condition said limit-means in accordance with said selection.

8. A calculating machine having means to drive it through cycles of operation, a frame, a carriage movable on said frame to a plurality of positions relative thereto, a multiple register pinion assembly movable to any of a series of register selecting positions, means normally positioning said assembly in one end position of said series, a plurality of register-selection control elements on said carriage, means driven by said drive means in the initial portion of a machine cycle and cooperating with different ones of said control elements in respective ones of said carriage positions to move said pinion assembly rapidly from said normal position to different ones of the other position of said series determined by said control elements, a plurality of normally effective stops to prevent substantial overthrow of said pinion assembly beyond respective ones of said other positions of the series, and means driven by said drive means in the initial portion of the machine cycle to extents determined by said control elements to disable those of said stops which would prevent movement of the pinion assembly to the selected position.

9. In a calculating machine having a cyclically operable general operating means, means to drive said operating means through cycles of operation, and a plural order series of differential actuator racks, a multiple register mechanism comprising a multiple register pinion assembly mounted for movement transversely of said racks, means normally urging said register pinion assembly to the limit of its movement in one direction, register selecting means, means controlled by said selecting means and operated by said operating means early in a cycle thereof to move said register pinon assembly in the opposite direction to align the pinions of selected registers with said racks, detent means to detain said register pinion assembly in such selected register positions during the major portion of said cycle, and means set into motion by said operating means before the end of said cycle and acting on said detent means to disable the latter after the end of the cycle to permit subsequent return of said register pinion assembly toward said limit by said urging means prior to a further cycle of said operating means.

10. In a calculating machine having a cyclically operable general operating means, means to drive said operating means through cycles of operation, and a plural order series of differential actuator racks, a multiple register mechanism comprising a multiple register pinion assembly mounted for movement transversely of said racks, means normally urging said register pinion assembly to the limit of its movement in one direction, register selecting means, means controlled by said selecting means and operated by said operating means early in a cycle thereof to move said register pinion assembly in the opposite direction to align the pinions of selected registers with said racks, detent means to detain said register pinion assembly in such selected register positions, normally effective means to disable said detent means, means operated from said operating means at the beginning of a cycle thereof to render said disabling means ineffective and said detent means effective, and means set into motion by said operating means before the end of said cycle and, by continuation of said motion, acting on said disabling means to cause the latter to disable said detent means after the end of said cycle to permit return of said register pinion assembly toward said limit by said urging means prior to a further cycle of operation of said operating means.

11. In a calculating machine having a cyclically operable general operating means, means to drive said operating means through cycles of operation, cycling control means to initiate cycles of operation of said operating mechanism by said driving means, and a plural order series of differential actuator racks, a multiple register mechanism comprising a multiple register pinion assembly mounted for movement transversely of said racks, means normally urging said register pinion assembly to a normal position at the limit of its movement in one direction, register selecting means, means controlled by said selecting means and operated by said operating means early in a cycle thereof to move said register pinion assembly in the opposite direction to align the pinions of selected registers with said racks, detent means to detain said register pinion assembly in such selected register positions, means cooperating with said detent means and with said operating means to be set into motion by the latter before the end of a cycle thereof to disable said detent means after the end of said cycle to permit subsequent return of said register pinion assembly to said normal position by said urging means, means to prevent said cycling control means for initiating a cycle of operation of the operating means, and means connected with said register pinion assembly to render said preventing means ineffective while said register pinion assembly is within a predetermined distance from its normal position.

12. In a calculating machine having a cyclically operable general operating means, means to drive said operating means through cycles of operation, cycling control means to initiate cycles of operation of said operating means by said driving means, and a plural order series of differential actuator racks, a multiple register mechanism comprising a multiple register pinion assembly mounted for movement transversely of said racks, means normally urging said register pinion assembly to a normal position at the limit of its movement in one direction, register selecting means, means controlled by said selecting means and operated by said operating means early in a cycle thereof to move said register pinion assembly in the opposite direction to align the pinions of selected registers with said racks, said moving means being returned to normal by said register pinion assembly as the latter is returned to normal position, detent means to detain said register pinion assembly in such selected register positions, disabling means to disable said detent means, means cooperating with said disabling means and with said operating means to be set into motion by the latter before the end of a cycle to cause said disabling means to disable said detent means after the end of said cycle to permit subsequent return of said register pinion assembly to said normal position by said urging means, means to prevent said cycling control means from initiating a cycle of operation of the operating means, and means controlled by said moving means to render said preventing means effective while said register pinion assembly is beyond a predetermined distance from its normal position.

References Cited in the file of this patent

UNITED STATES PATENTS

| | | |
|---|---|---|
| 1,909,715 | Pasinski | May 16, 1933 |
| 1,931,113 | Muller | Oct. 17, 1933 |
| 2,055,703 | Perkins | Sept. 29, 1936 |
| 2,340,372 | Fettig | Feb. 1, 1944 |
| 2,391,089 | Friden et al. | Dec. 18, 1945 |
| 2,526,734 | Davidson et al. | Oct. 24, 1950 |
| 2,540,189 | Davidson et al. | Feb. 6, 1951 |
| 2,558,458 | Pitman | June 26, 1951 |